United States Patent [19]

Eckenrode et al.

[11] Patent Number: 4,796,494
[45] Date of Patent: Jan. 10, 1989

[54] HEADLIGHT POSITION ADJUSTMENT ASSEMBLY

[75] Inventors: Robert T. Eckenrode, North Canton; Joseph J. Dillon, Jr., Canal Fulton, both of Ohio

[73] Assignee: Eaton Corporation, Cleveland, Ohio

[21] Appl. No.: 31,636

[22] Filed: Mar. 30, 1987

[51] Int. Cl.⁴ ............................................. B25B 33/00
[52] U.S. Cl. ........................................ 81/484; 81/488; 29/271
[58] Field of Search .................. 81/484, 488; 29/271; 269/280, 321 W; 362/71, 272, 80

[56] References Cited

U.S. PATENT DOCUMENTS 4,108,025 8/1978 Stine et al. ............................ 81/484

Primary Examiner—James G. Smith
Attorney, Agent, or Firm—A. E. Chrow

[57] ABSTRACT

A vehicular headlight position adjusting assembly (100) is provided. Assembly (100) includes a two-part housing (2, 4) within which meshingly engaged gears (22, 32) are rotationally supported in a manner providing an angular relationship between their respective rotational axis. Gears (22, 32) are rotated by an input drive member (16) extending from housing (2, 4). Gear (32) is threadingly engaged with an adjustment member (20) having an end operatively engaged with a movable frame (46) upon which the headlight is mounted and having an elongate flat (26) that slidingly engages a projection (24) of gear (22) operative to prevent adjustment member (20) from rotating such that rotation of drive member (16) in opposite directions causes adjustment member (20) to traverse without rotation in opposite directions to adjust the headlight position.

3 Claims, 2 Drawing Sheets

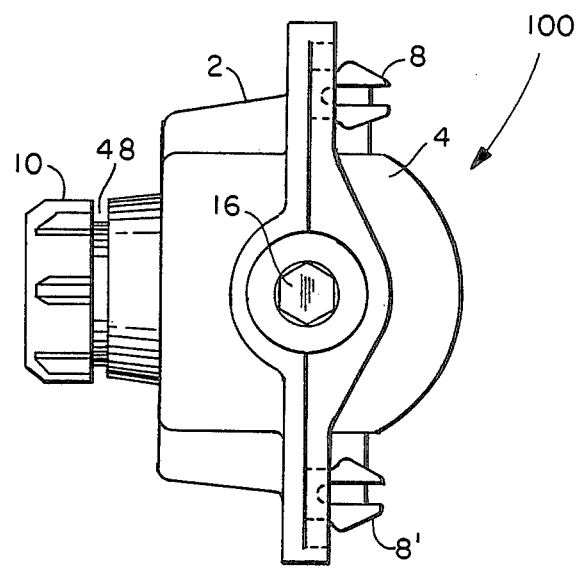
Fig. 3
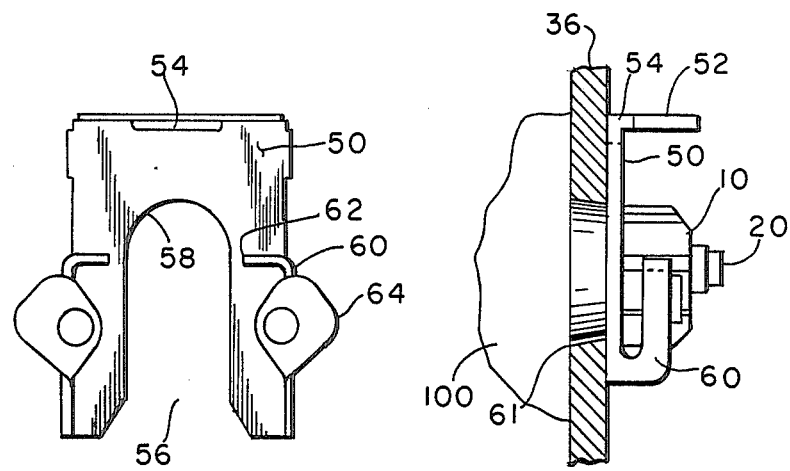
Fig. 4
Fig. 5

4,796,494

HEADLIGHT POSITION ADJUSTMENT ASSEMBLY

INTRODUCTION

This invention relates generally to an assembly for manually adjusting position of a headlight such as a vehicular headlight mounted on a movable frame and more particularly to such assembly that includes a gear box assembly enclosed within a housing that is operative to cause an adjusting member operatively connected to the headlight frame to traverse without rotation in opposite axial directions and move the frame in response to rotation of an angularly oriented input drive member in opposite rotational directions.

BACKGROUND OF THE INVENTION

Vehicular headlights have for many years been mounted on movable frames to enable periodic adjustment of their position which is apt to change due to vibration and the like so as to illuminate the road ahead in a suitable manner preferably without focusing directly upon on-coming vehicles.

Although the headlight frame position has commonly been adjustable by means of straight screws threadingly engaged with a fixed frame and located so that upon rotation they operate to move the headlight and its frame upwardly and downwardly and to the right and left as required, lately, due to more complex designs and more difficult accessability, gear box assemblies have been employed that provide for a rotatable input drive screw and an output adjusting screw that are angularly displaced from each other of which one example is disclosed in U.S. Pat. No. 4,665,469 issued on May 12, 1987 and owned by the assignee of the present invention, and the disclosure of which is incorporated herein by reference. The present invention is therefore directed towards a headlight position adjusting assembly that employs a gear box between an input drive member and an angularly displaced output adjustment member but, rather than having both rotate, is uniquely designed such that rotation of the input drive member in opposite rotational directions is operative to traverse the output adjustment member in opposite axial directions without rotation by means contained within a housing protectively enclosing the gears.

SUMMARY OF THE INVENTION

Accordingly, it is an object of this invention to provide a headlight position adjusting assembly having a rotatable input drive member drivingly connected to an output adjustment member in a manner that enables the adjustment member to traverse in opposite axial directions without rotation to adjust the position of the headlight.

It is another object of this invention to provide a headlight position adjusting assembly having a rotatable input drive member drivingly connected by means contained within a gear box housing in a manner operative to cause an output adjustment member to traverse in opposite axial directions without rotation to adjust the position of the headlight.

BRIEF DESCRIPTION OF THE DRAWINGS

FIG. 3 is a view taken along line 3—3 of the headlight position adjusting assembly embodiment shown in FIG. 2;

FIG. 4 is a front view of an embodiment of a clip adapted to secure the embodiment of the headlight position adjusting assembly shown in FIGS. 1-3 to a fixed frame; and FIG. 5 shows a partially cut-away side view of the clip of FIG. 4 securing the headlight position adjusting assembly of FIGS. 1-3 to a fixed frame.

DESCRIPTION OF SOME PREFERRED EMBODIMENTS

Figure 1:
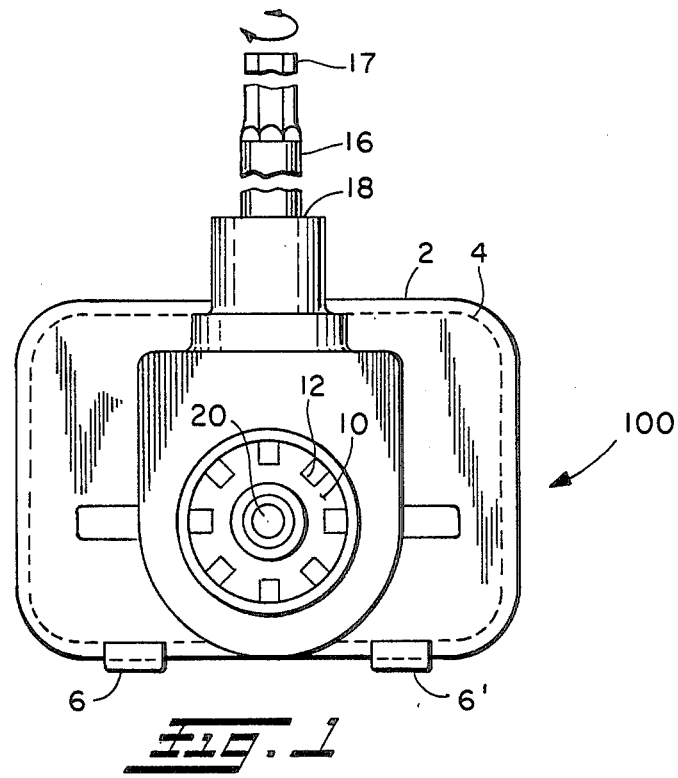
FIG. 1 shows a left side view taken along line 2—2 of an embodiment of the headlight position adjusting assembly of the invention shown in FIG. 2.

Assembly 100 of FIG. 1 has a rotatable elongate input drive member 16 such as a rod or shaft having an exposed end preferably including flats 17 or the like to facilitate rotating member 16. Drive member 16 enters through opening 18 into a two-part housing comprising housing members 2 and 4 that are releasably secured together preferably by being hinged together at one end such as by spaced-apart hinge members 6 and 6' of housing member 4 which extend through corresponding spaced-apart openings in housing member 2 (not referenced) and which are further preferably releasably secured together by means of spaced-apart resilient pins 8 and 8' shown in FIG. 3 extending from a surface of housing member 2 through corresponding spaced-apart openings in housing member 4 on an opposite side of assembly 100 from hinge members 6 and 6'. Thus members 2 and 4 can be pried apart from pins 8 and 8' and then pivot open on hinge members 6 and 6' to provide access to the inside of the housing.

Housing members 2 and 4 are required to be secured to a fixed frame 36 of the motor vehicle. Although any means may be used that does not interfere with its operation, housing member 2 is preferably provided with a projection 10 that includes a transverse groove 48 and at least one axial groove 12 in its outer surface that is adapted to fit through an opening in frame 36 and be secured thereto by a clip hereinafter described with respect to FIGS. 4 and 5.

Projection 10 is provided with a central opening 14 through which a driven adjusting member 20 is able by means contained with the housing to traverse in opposite axial directions in response to rotation of drive member 16 in opposite rotational directions as hereinafter more fully described with respect to FIG. 2.

Figure 2:
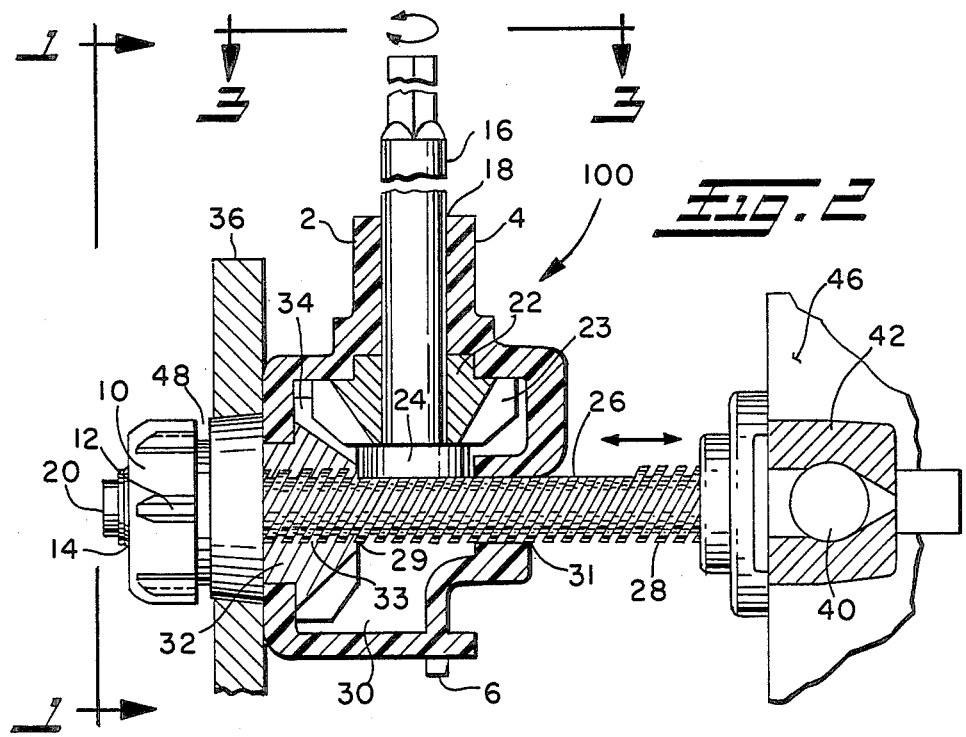
FIG. 2 is a partially cut-away top view of an embodiment of the headlight position adjusting assembly of the invention.

In FIG. 2, housing members 2 and 4 protectively enclose a cavity 30 containing drive gear 22 and driven gear 32 having substantially orthogonal rotational axis. Although an orthogonal relationship between the rotational axis of gears 22 and 32 is likely the most common, it is to be understood that other angular relationships between the rotational axis of gears 22 and 32 are included within the scope of the invention.

Drive gear 22 is drivingly connected to drive member 16 with housing members 2 and 4 adapted to provide rotational support for both. Drive gear 22 has a projection 24 that rotates along with gear 22 upon rotation of drive member 16.

Drive gear 22 has teeth 23 that meshingly engage teeth 34 of driven gear 32 which is rotationally supported by housing members 2 and 4. Driven gear 32 rotates in opposite rotational directions in response to drive member 16 rotating driven gear 32 in opposite rotational directions.

Adjusting member 20 is provided with external threads 28 and extends axially through an opening 29 in gear 32 centered about its rotational axis that is provided with internal threads 33 which threadingly engage threads 28. Adjusting member 20 is aligned along the central rotational axis of gear 32 so that when gear 32 is rotated by gear 22 in opposite directions, adjusting member 20 transverses in opposite axial directions.

The opposite ends of adjusting member 20 extend through respective opposite axial aligned openings 14 and 31 through projection 10 and processing member 4 respectively and is provided with an elongate flat 26 that faces towards and is slidingly engaged by the end of projection 24 of drive gear 22 which prevents adjusting member 22 from rotating as it traverses in opposite axial directions in response to rotation of driven gear 32 in opposite directions.

An end of adjusting member 20 is engaged with the movable frame to which the headlight is secured such as shown on the right side as viewed in FIG. 2 where member 20 is provided with a spherical ball 40 which releasably interlocks with a yoke 42 attached to movable frame 46 which carries the headlight.

Thus, rotation of drive member 16 in opposite directions causes driven gear 32 to be rotated by drive gear 22 in opposite directions which in turn causes adjusting member 20 to traverse in opposite axial directions and prevented from rotating by the sliding engagement between flat 26 and projection 24 of drive gear 22 within housing members 2 and 4 which moves frame 46 in opposite directions to adjust the headlight position although shown as only a singular assembly in the figures, at least two of the assemblies of the invention are required to position a vehicular headlight with one of the assemblies operative to move the movable frame upon which the headlight is mounted upwardly and downwardly and the other assembly operative to move the movable frame from right to left or vice versa.

In order to operate, assembly 100 must be secured to a fixed frame such as frame 36 shown in FIG. 2. Although any suitable means may be employed, preferably assembly 100 is secured to a fixed frame by means of a transverse slot or groove 48 and at least one axial extending slot 12 in projection 10 of housing member 2 as shown in FIG. 2 and hereinafter more fully described with respect to FIGS. 4 and 5.

In FIG. 5, projection 10 extends through an opening 61 in fixed frame 36. Both opening 61 and projection 10 are preferably circular in cross-section. Transverse slot 48 is positioned along projection 10 so that it registers with the clip shown in FIG. 4 adjacent the opposite side of opening 61 through which projection 10 is inserted. The outer surface of projection 10 within opening 61 is preferably tapered axially so that it becomes wedged in opening 61 when the clip of FIG. 4 is inserted in transverse groove 48 as hereinafter described with respect to FIG. 5.

A clip, such as shown in FIG. 4 used to secure projection 10 to frame 36 is disclosed is U.S. Pat. No. 4,735,534 owned by the assignee of the assignee of this invention, and is used to secure projection 10 housing of assembly 100 to fixed frame 36.

The clip has an open ended slot 56 in a base portion 50 having an edge 58 adapted to engage transverse groove 48 of projection 10 and secure it from axial movement relative opening 61. The clip is provided with at least one resilient arm 60 that extends outwardly from base portion 50 to a free-end 62 that is adapted to engage one of axial extending groove 12 and prevent projection 10 from rotating. Arm 60 is preferably provided with a bends and a brace 64 such as shown in FIG. 4 to provide it with sufficient resiliency and strength to firmly engage slot 12. The clip may include an overhang 52 which extends in overhanging relationship to projection 10 and may further include an opening 54 at the intersection between overhang 52 and base portion 50 for insertion of a tool to enable the clip to be easily pried away from projection 10 and frame 36 when such is desired.

Assembly 100 may be made from any suitable material or materials. Preferably, drive member 16, adjusting member 20, drive gear 22, and driven gear 32 are made from a suitable metal, housing members 2 and 4 are made from a plastic such as a suitable nylon sold under the Trademark "Zytel" by the Dupont Company, and the clip shown in FIG. 4 is preferably made from a resilient spring steel.

What is claimed is:

1. A vehicular headlight position adjusting assembly comprising:
    intermeshed drive and driven gears having their respective rotational axis angularly displaced from each other,
    an elongate drive member drivingly connected to the drive gear and operable upon rotation to cause both the drive gear and the driven gear to rotate about their respective rotational axis
    an elongate adjusting member threadingly engaged with the driven gear and having an end thereof adapted to engage a movable frame upon which the headlight is mounted,
    a housing comprising first and second housing members releasably joined together and adapted to protectively enclose the drive and driven gears and having respective openings therein enabling the drive and adjusting members to extend therefrom,
    means for securing the housing to a fixed frame on the vehicle so as to enable the adjusting member to move the movable frame in response to rotation of the drive member,
    and means within the housing members for preventing the adjusting member from rotating whilst enabling the adjusting member to traverse in opposite axial directions in response to rotation of the drive member in opposite rotational directions, said means comprising an elongate flat on the adjusting member that is slidingly engaged with a projection from the drive gear operable to prevent the adjusting member from rotating whilst enabling the adjusting member flat to slide in opposite axial directions relative thereto.

2. The assembly of claim 1 wherein the means for securing the housing to a fixed frame comprises:
    a projection extending from the housing adapted to extend through an opening in the fixed frame when the housing is abutted thereagainst,
    a transverse groove in the projection positioned to lay adjacent the opposite side of the frame opening through which the housing projection is inserted,
    at least one axial extending groove in the projection that is exposed on the opposite side of the frame opening into which the projection is received and is oriented substantially orthogonal to the transverse groove, and a clip having an open-ended slot therein having an edge adapted to engage the projection transverse groove and prevent the projection from moving axially within the frame opening and having at least one resilient arm extending from the clip to a free-end thereof adapted to engage the orthogonal groove and thereby prevent the projection from rotating relative the frame.

3. The assembly of claim 1 wherein the housing members are releasably joined together by means of a hinged engagement therebetween operable to enable one of the housing members to pivot away from the other housing member for a distance sufficient to provide access therewithin.

* * * * *